J. MARQUART, Jr.
Water Cask Guage.
No. 7,173.
Patented March 12, 1850.
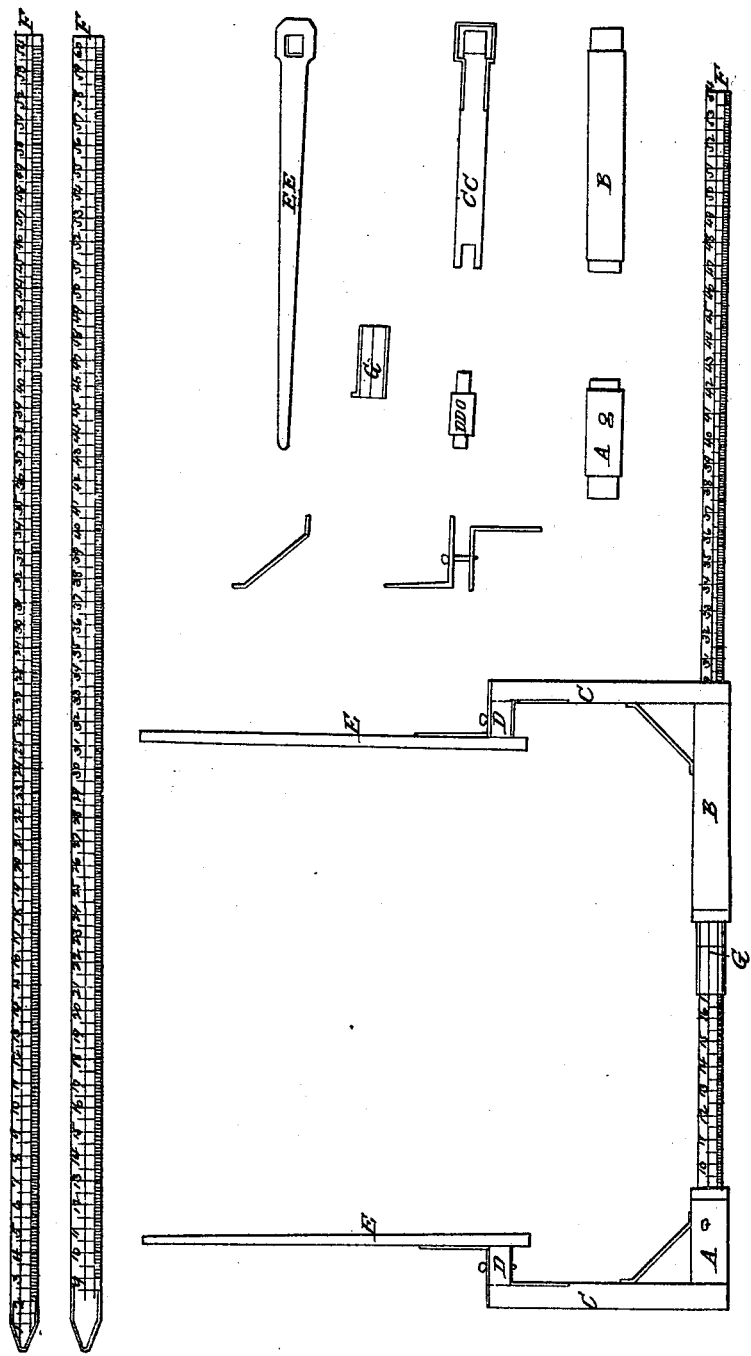

UNITED STATES PATENT OFFICE.

JOHN MARQUART, JR., OF READING, PENNSYLVANIA, ASSIGNOR TO HENRY SCHREINER, OF SAME PLACE.

GAGE FOR WATER-CASKS.

Specification of Letters Patent No. 7,173, dated March 12, 1850.

*To all whom it may concern:*

Be it known that I, JOHN MARQUART, Jr., of Reading, in the county of Berks and State of Pennsylvania, have invented a new and improved instrument with a new and improved mode of taking the dimensions of standing casks, oil-cans, cones, cylinders, &c., as well as all lying casks, for the purpose of ascertaining their contents; and I do hereby declare that the following is a full, clear, and exact description thereof, reference being had to the accompanying drawings and to the letters of reference marked thereon, the same being referred to in the assignment by me to Henry Schreiner of this place, the whole making one instrument.

The nature of my invention consists in the construction of a square tube A, five inches long to be fastened with a screw to the left end of rod F, with a joint C, ten inches long attached to it at right angles, with another joint D, three inches long parallel with tube A, which forms the one end of an instrument similar to the well known sliding caliper, or beam compass, which is used only for taking lengths and not diameters; but by adding another straight joint E, fifteen inches long parallel with joint C, to slip on joint D, and fasten with a small thumb screw (which takes but a moment). You have the one end of an instrument for gaging standings casks, &c. At the right end of rod F is a square tube B, ten inches long, with all the points attached the same as tube 4, but is hollow throughout, and slides backward and forward on rod F which is 54 inches long, marked on two sides with inches and tenths; the one side commencing with 9 three inches from the left end is the side to be used when the instrument is used (the left end of tube B, always shows on rod F, the length or diameter of what is measured) but the opposite when the rod is used alone with the brass slide G, for taking head diameters outside and bung diameters inside. The joints or rods E, E, are always to be used for standing casks, oil-cans, cones cylinders &c., but to be taken off for lying casks.

What I claim as my original invention and desire to secure by Letters Patent is—

The combination of the joints or rods E, E, with the piece A, C, D, scale F, and piece B, C, D, in the manner set forth.

JOHN MARQUART, JR.

Witnesses:
   H. ROBERTS,
   GEORGE ERETY.